US008884943B2

(12) United States Patent
Hsieh et al.

(10) Patent No.: US 8,884,943 B2
(45) Date of Patent: Nov. 11, 2014

(54) DRIVING APPARATUS OF DISPLAY WITH PRE-CHARGE MECHANISM

(71) Applicant: Novatek Microelectronics Corp., Hsinchu (TW)

(72) Inventors: Jin-Sheng Hsieh, Hsinchu County (TW); Hsueh-Yi Lee, Hsinchu County (TW); Wing-Kai Tang, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 13/925,821

(22) Filed: Jun. 24, 2013

(65) Prior Publication Data

US 2013/0285999 A1 Oct. 31, 2013

Related U.S. Application Data

(62) Division of application No. 12/889,436, filed on Sep. 24, 2010, now Pat. No. 8,599,185.

(30) Foreign Application Priority Data

Jan. 11, 2010 (TW) ............................... 99100544 A

(51) Int. Cl.
*G06F 3/038* (2013.01)
*G09G 5/00* (2006.01)
*G09G 3/20* (2006.01)

(52) U.S. Cl.
CPC ........ *G09G 5/003* (2013.01); *G09G 2310/0248* (2013.01); *G09G 3/2011* (2013.01)
USPC ........................................... 345/211; 345/690

(58) Field of Classification Search
USPC .................................... 345/212, 211, 690, 89
See application file for complete search history.

(56) References Cited

U.S. PATENT DOCUMENTS

| | | | | |
|---|---|---|---|---|
| 2004/0257252 | A1* | 12/2004 | Wei | 341/141 |
| 2005/0068286 | A1* | 3/2005 | Morita | 345/100 |
| 2006/0290636 | A1* | 12/2006 | Hong | 345/98 |
| 2009/0102293 | A1* | 4/2009 | Hsieh | 307/109 |

FOREIGN PATENT DOCUMENTS

| | | |
|---|---|---|
| TW | 530287 | 5/2003 |
| TW | 200625235 | 7/2006 |
| TW | I295051 | 3/2008 |
| TW | 200912863 | 3/2009 |
| TW | I319173 | 1/2010 |

OTHER PUBLICATIONS

"Office Action of Taiwan counterpart application" issued on Jun. 7, 2013, p. 1-p. 15.

* cited by examiner

*Primary Examiner* — Chanh Nguyen
*Assistant Examiner* — Jonathan Blancha
(74) *Attorney, Agent, or Firm* — Jianq Chyun IP Office

(57) ABSTRACT

A driving apparatus of a display is disclosed. The driving apparatus includes a digital-to-analog converter (DAC) circuit, an output buffer circuit and a pre-charge circuit. The DAC circuit receives a display data with a digital format for generating a gray level voltage. The output buffer circuit is coupled to the DAC circuit, and receives the gray level voltage. The output buffer circuit has an output terminal to output a driving output signal. The pre-charge circuit is coupled to the output buffer circuit, and generates a pre-charge output signal according to the gray level voltage and a pre-charge enable signal, and outputs the pre-charge output signal to the output terminal of the output buffer circuit.

7 Claims, 4 Drawing Sheets

DRIVING APPARATUS OF DISPLAY WITH PRE-CHARGE MECHANISM

CROSS-REFERENCE TO RELATED APPLICATION

This application is a Divisional of and claims the priority benefit of U.S. patent application Ser. No. 12/889,436, filed on Sep. 24, 2010, now pending, which claims the priority benefits of Taiwan application Serial No. 99100544, filed Jan. 11, 2010. The entirety of each of the above-mentioned patent applications is hereby incorporated by reference herein and made a part of this specification.

BACKGROUND OF THE INVENTION

1. Field of the Invention

The present invention relates to a driving apparatus. More particularly, the present invention relates to a driving apparatus of a display.

2. Description of Related Art

A so-called pre-charge circuit is generally designed in a driving apparatus of a display to increase a display quality thereof. The pre-charge circuit outputs a pre-charge voltage to a pixel before the driving apparatus (for example, a source driver) providing a gray level voltage according to a display data corresponding to the pixel, so that the pixel be pre-charged before being driven and a response time and a current consumption for the pixel are reduced.

In a conventional driving apparatus, the pre-charge circuit only provides fixed pre-charge voltages at specific time points, so that in case of different gray level voltages, the pre-charge voltage can be inadequate or excessive. Referring to FIG. 1A and FIG. 1B, FIG. 1A and FIG. 1B are schematic diagrams illustrating different output signals of a conventional driving apparatus. In FIG. 1A, the driving apparatus first provides a pre-charge output signal with a voltage level equal to a level Veq to an output signal VSO according to a pre-charge enable signal PreEn, and then provides a driving output signal with a voltage level higher than the level Veq to serve as the output signal VSO according to an output enable signal SOE. In this case, since the voltage level of the pre-charge output signal is inadequate, a pre-charge effect is influenced. Therefore, when the driving output signal is generated, a period of time is required for the driving output signal reaching a value of a desired gray level voltage, and the power consumption thereof is relatively high.

Conversely, in FIG. 1B, the voltage level Veq of the pre-charge output signal is far higher than the voltage level of the driving output signal. In this case, the excessive high pre-charge voltage can lead to unnecessary power consumption of the driving apparatus.

SUMMARY OF THE INVENTION

The present invention is directed to a plurality of driving apparatus of a display, in which a voltage level of a pre-charge output signal is adjusted according to a gray level voltage generated according to a display data.

The present invention provides a driving apparatus of a display. The driving apparatus includes a digital-to-analog converter (DAC) circuit, an output buffer circuit and a pre-charge circuit. The DAC circuit receives a display data with a digital format for generating a gray level voltage. The output buffer circuit is coupled to the DAC circuit, and receives the gray level voltage. The output buffer circuit has an output terminal to output a driving output signal. The pre-charge circuit is coupled to the output buffer circuit, and generates a pre-charge output signal according to the gray level voltage and a pre-charge enable signal, and outputs the pre-charge output signal to the output terminal of the output buffer circuit.

In an embodiment of the present invention, the pre-charge circuit directly receives the gray level voltage, and generates the pre-charge output signal according to the gray level voltage when the pre-charge enable signal is enabled.

In an embodiment of the present invention, the pre-charge circuit receives the gray level voltage and the pre-charge enable signal, and generates the pre-charge output signal according to a comparison result of the gray level voltage and the output signal when the pre-charge enable signal is enabled.

The present invention provides a driving apparatus of a display. The driving apparatus includes a digital-to-analog converter (DAC) circuit, an output buffer circuit and a pre-charge circuit. The DAC circuit receives a display data with a digital format for generating a gray level voltage. The output buffer circuit is coupled to the DAC circuit, and has an output terminal to output an output signal. The output buffer circuit receives the gray level voltage and the output signal, and compares the gray level voltage and the output signal to generate a comparison result. The pre-charge circuit is coupled to the output buffer circuit, and generates and outputs a pre-charge output signal to the output terminal of the output buffer circuit according to the comparison result and a pre-charge enable signal.

According to the above descriptions, in the present invention, the gray level voltage generated according to the display data is used to adjust a voltage level of the pre-charge output signal, so that problems of excessive pre-charging or inadequate pre-charging due to a fixed pre-charge output signal can be avoided. Therefore, not only a power consumption is effectively reduced and but also a display quality of the display is improved.

In order to make the aforementioned and other features and advantages of the present invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
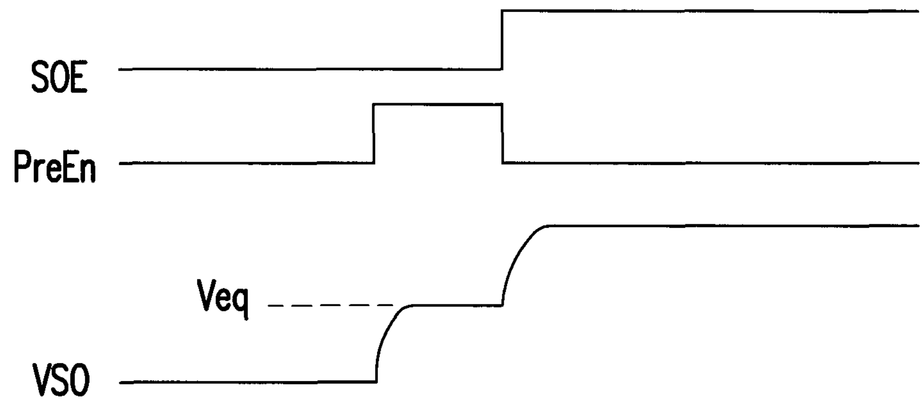
FIG. 1A (RELATED ART)
FIG. 1A and FIG. 1B are schematic diagrams illustrating different output signals of a conventional driving apparatus.
Figure 1B:
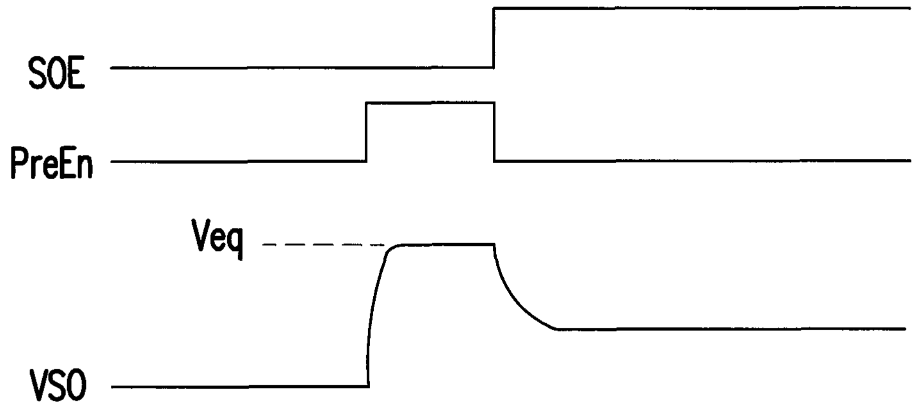
FIG. 1B (RELATED ART)
Figure 2:
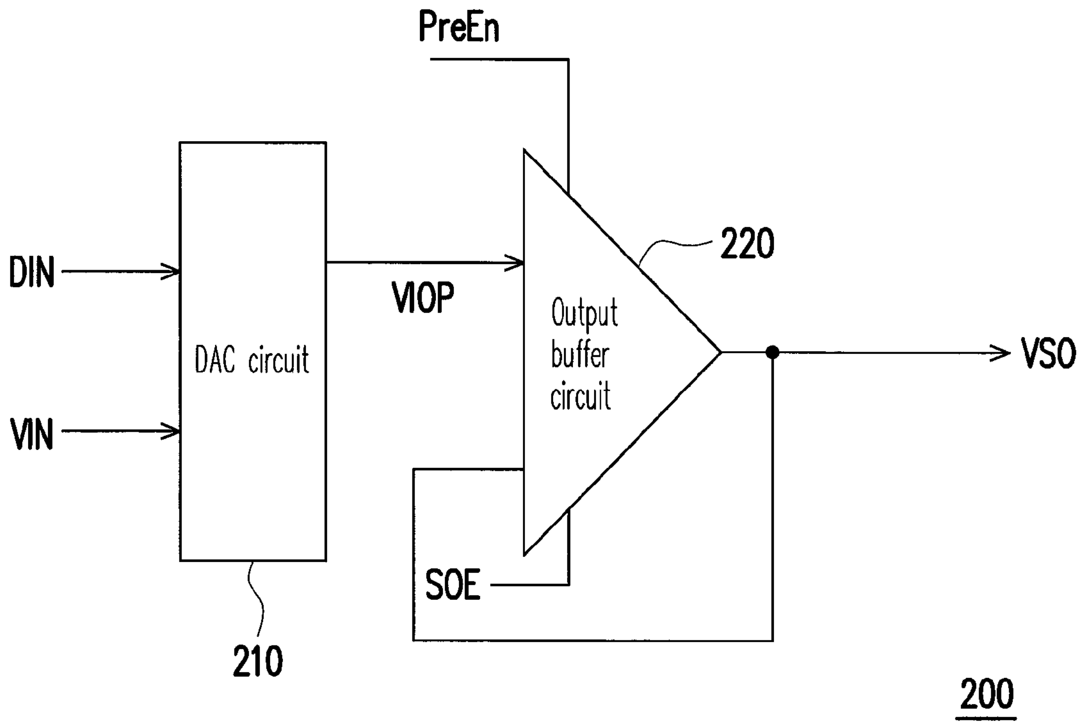
FIG. 2 is a schematic diagram illustrating a driving apparatus of a display according to an embodiment of the present invention.

Referring to FIG. 2, FIG. 2 is a schematic diagram illustrating a driving apparatus 200 of a display according to an embodiment of the present invention. The driving apparatus 200 includes a digital-to-analog converting (DAC) circuit 210 and an output buffer circuit 220. The DAC circuit 210 receives a display data DIN with a digital format for generating a gray level voltage VIOP. The output buffer circuit 220 is coupled to the DAC circuit 210, and receives the gray level voltage VIOP, a pre-charge enable signal PreEn and an output enable signal SOE.

In the present embodiment, the DAC circuit 210 is implemented by a voltage selector. The voltage selector receives and selects one of a plurality of input voltages VIN with an analog format to serve as the gray level voltage VIOP according to the display data DIN with the digital format. Taking the display data DIN of 3 bits as an example, the DAC circuit 210 can receive 8 input voltages VIN for selection.

The output buffer circuit 220 generates a driving output signal to serve as an output signal VSO according to the output enable signal SOE, and generates a pre-charge output signal to serve as the output signal VSO according to the pre-charge enable signal PreEn. In brief, the output buffer circuit 220 generates the driving output signal to serve as the output signal VSO when the output enable signal SOE is enabled, and generates the pre-charge output signal to serve as the output signal VSO when the pre-charge enable signal PreEn is enabled, wherein the output enable signal SOE and the pre-charge enable signal PreEn cannot be enabled simultaneously.

Moreover, the output buffer circuit 220 compares the received driving output signal with the gray level voltage VIOP to generate a comparison result at a moment when the pre-charge enable signal PreEn is enabled. Then, the output buffer circuit 220 determines a voltage level of the generated pre-charge output signal according to the comparison result. In this way, the voltage level of the pre-charge output signal output by the output buffer circuit 220 can be dynamically adjusted according to a difference between the gray level voltage VIOP and the driving output signal, so as to avoid outputting a pre-charge output signal with a too high or too low voltage level.

Figure 3:
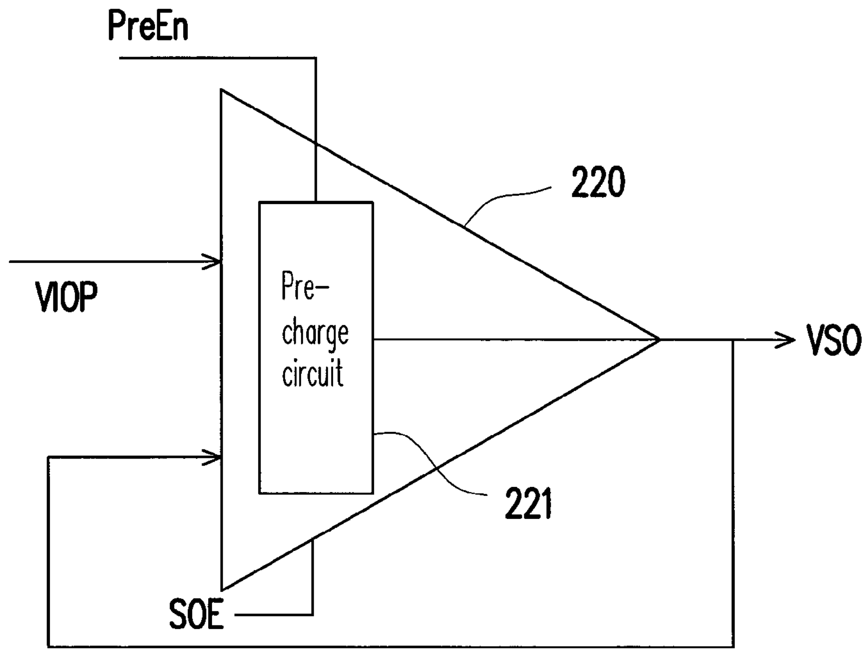
FIG. 3 is an enlarged schematic diagram illustrating an output buffer circuit of FIG. 2.

Referring to FIG. 3 and FIG. 2, FIG. 3 is an enlarged schematic diagram illustrating the output buffer circuit 220 of FIG. 2. The output buffer circuit 220 includes a pre-charge circuit 221. The pre-charge circuit 221 receives the pre-charge enable signal PreEn and the comparison result of the gray level voltage VIOP and the driving output signal (in a pre-charge state (a state that the pre-charge signal PreEn is enabled), the driving output signal serves as the output signal VSO), and provides the pre-charge output signal to serve as the output signal VSO according to the comparison result when the pre-charge enable signal is enabled.

It should be noticed that the output buffer circuit 220 can be implemented by an operation amplifier. The operation amplifier serving as the output buffer circuit 220 has a first input terminal, a second input terminal, a pre-charge enable input terminal and an output terminal, wherein the first input terminal receives the gray level voltage VIOP, the second input terminal receives the driving output signal serving as the output signal VSO, the pre-charge enable input terminal receives the pre-charge enable signal PreEn, and the output terminal outputs the output signal VSO (it should be noticed that the output signal VSO can be the driving output signal or the pre-charge output signal, and in the pre-charge state, the output signal VSO is the driving output signal).

Figure 4:
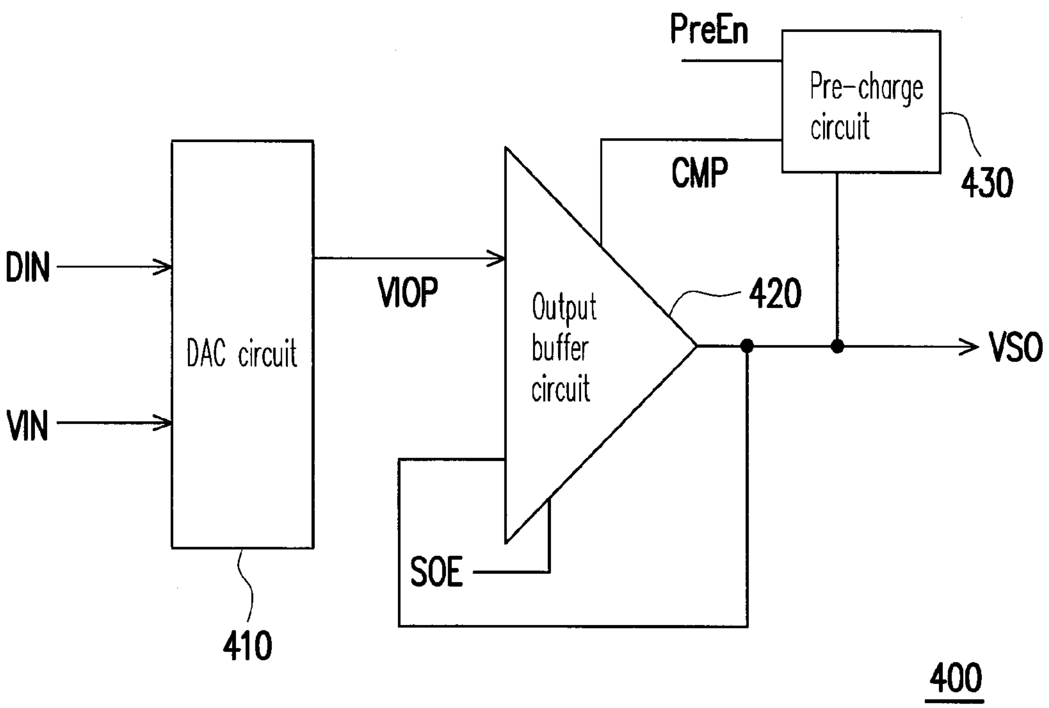
FIG. 4 is a schematic diagram illustrating a driving apparatus of a display according to another embodiment of the present invention.

Then, referring to FIG. 4, FIG. 4 is a schematic diagram illustrating a driving apparatus 400 of a display according to another embodiment of the present invention. The driving apparatus 400 includes a DAC circuit 410, an output buffer circuit 420 and a pre-charge circuit 430. The DAC circuit 410 receives the display data DIN with a digital format for generating the gray level voltage VIOP. In the present embodiment, the DAC circuit 410 is implemented by a voltage selector. Namely, the DAC circuit 410 receives and selects one of a plurality of the input voltages VIN to serve as the gray level voltage VIOP according to the display data DIN.

The output buffer circuit 420 is coupled to the DAC circuit 410, and receives the gray level voltage VIOP. The output buffer circuit 420 has an output terminal to output an output signal. Moreover, in the present embodiment, the output buffer circuit 420 receives the output enable signal SOE and a comparison result CMP. Here, the comparison result CMP is generated by comparing the gray level voltage VIOP with the driving output signal serving as the output signal VSO.

Figure 5:
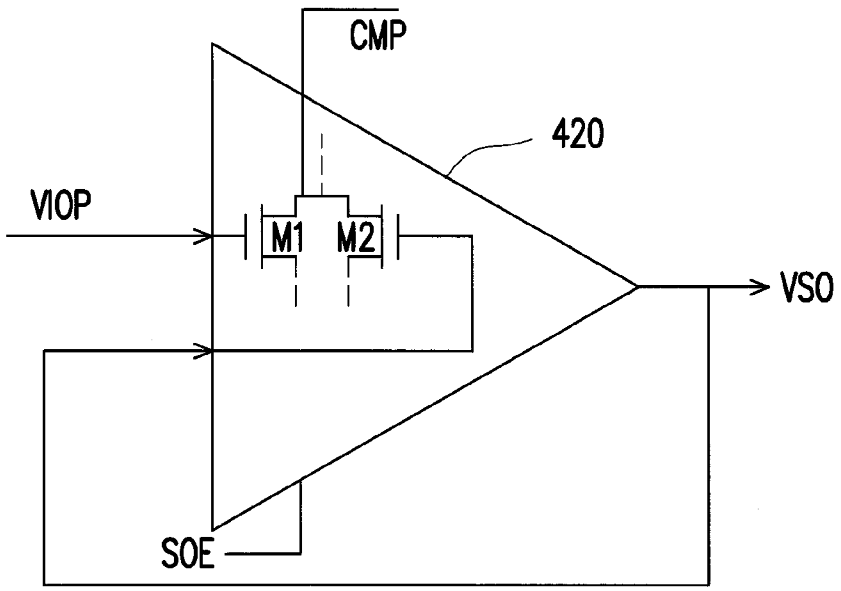
FIG. 5 is an enlarged schematic diagram illustrating an output buffer circuit of FIG. 4 according to an embodiment of the present invention.

Referring to FIG. 5 for a further description of a comparison operation between the gray level voltage VIOP and the driving output signal serving as the output signal VSO, and FIG. 5 is an enlarged schematic diagram illustrating the output buffer circuit 420 according to an embodiment of the present invention. The output buffer circuit 420 includes a differential pair formed by transistors M1 and M2, wherein the transistors M1 and M2 respectively receive the gray level voltage VIOP and the driving output signal serving as the output signal VSO. In this way, the comparison result CMP can be generated at a common terminal (i.e. mutually connected sources/drains of the transistors M1 and M2) of the differential pair.

Actually, the output buffer circuit 420 can be implemented by an operation amplifier, and the operation amplifier has a first input terminal, a second input terminal and an output terminal, wherein the first input terminal receives the gray level voltage VIOP, and the second input terminal is coupled to the output terminal. The operation amplifier generally includes at least one set of the differential pair. Namely, when the output buffer circuit 420 is implemented by the operation amplifier, the comparison result CMP can be directly generated through the existed differential pair without using an extra circuit.

Referring to FIG. 4 again, the pre-charge circuit 430 is coupled to the output buffer circuit 420, and receives the comparison result CMP generated by the output buffer circuit 420, and receives the pre-charge enable signal PreEn. When the pre-charge enable signal PreEn is enabled, the pre-charge circuit 430 generates a pre-charge output signal to the output terminal of the output buffer circuit 420 to serve as the output signal VSO according to the comparison result. It should be noticed that the output enable signal SOE received by the output buffer circuit 420 is disabled, so that the output buffer circuit 420 is now maintained to a high impedance without conflicting to the output of the pre-charge circuit 430.

Then, the pre-charge enable signal PreEn is disabled, and the output enable signal SOE is enabled. The pre-charge circuit 430 is correspondingly changed to the high impedance according to the disabled pre-charge enable signal PreEn, and the output buffer circuit 420 outputs the driving output signal to serve as the output signal VSO according to the enabled output enable signal SOE.

It should be noticed that the pre-charge circuit 430 can dynamically adjust a voltage level of the pre-charge output signal according to the comparison result CMP of the gray level voltage VIOP and the output signal VSO. Namely, the driving apparatus 400 of the present embodiment can provide the pre-charge output signal more close to the voltage level of the required gray level voltage VIOP, so as to reduce unnecessary power consumption.

Figure 6:
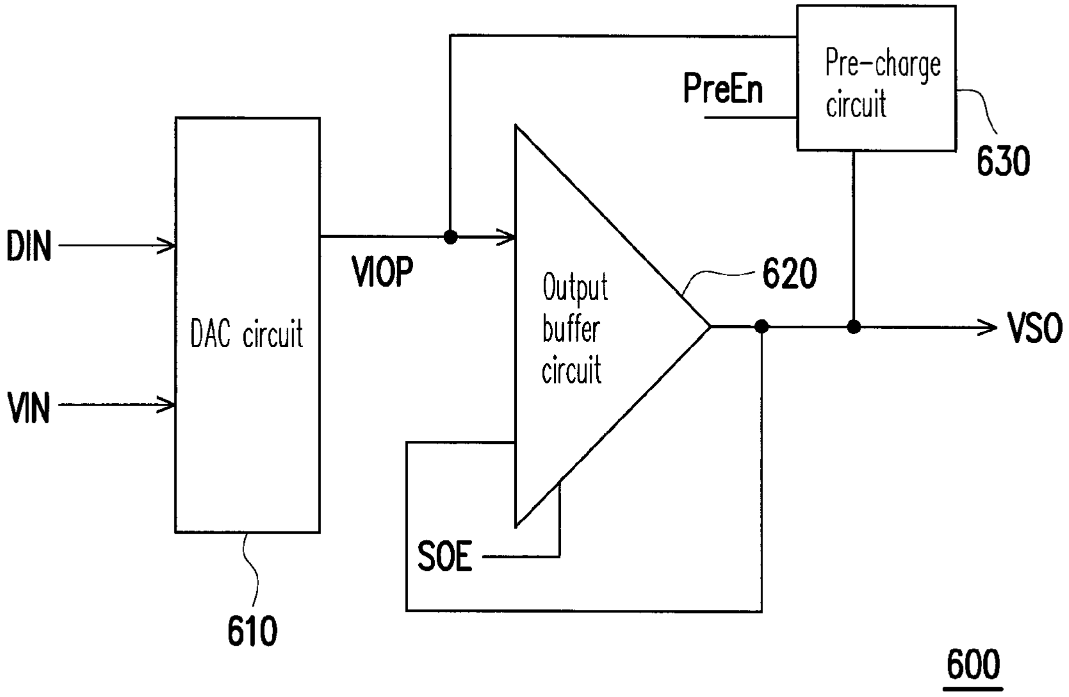
FIG. 6 is a schematic diagram illustrating a driving apparatus of a display according to still another embodiment of the present invention.

Referring to FIG. 6, FIG. 6 is a schematic diagram illustrating a driving apparatus 600 of a display according to still another embodiment of the present invention. The driving apparatus includes a DAC circuit 610, an output buffer circuit 620 and a pre-charge circuit 630. A difference between the driving apparatus 600 and the aforementioned driving apparatus 400 is that the output buffer circuit 620 does not provide a comparison result to the pre-charge circuit 630, and the pre-charge circuit 630 directly receives the gray level voltage VIOP to serve as a basis for providing a pre-charge output signal.

In summary, in the present invention, the driving apparatus of the display can provide the pre-charge output signal close to the gray level voltage under the pre-charge state (a state when the pre-charge enable signal is enabled) according to the gray level voltage converted based on the display data with the digital format, or the comparison result of the gray level voltage and the output signal, so that the pre-charge operation of the display can be more effective, and waste of power can be effectively avoided.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A driving apparatus of a display, comprising:

a digital-to-analog converter (DAC) circuit, for receiving a display data with a digital foimat, and generating a gray level voltage according to the display data;

an output buffer circuit, coupled to the DAC circuit for receiving the gray level voltage, and the output buffer circuit having an output terminal to output an output signal; and a pre-charge circuit, coupled to the output buffer circuit, and generating a pre-charge output signal to the output terminal of the output buffer circuit according to a pre-charge enable signal and a comparison result of the gray level voltage and the output signal.

2. The driving apparatus of the display as claimed in claim 1, wherein the pre-charge circuit directly receives the gray level voltage, and generates the pre-charge output signal according to the gray level voltage when the pre-charge enable signal is enabled.

3. The driving apparatus of the display as claimed in claim 1, wherein the pre-charge circuit receives the gray level voltage and the pre-charge enable signal, and generates the pre-charge output signal according to the comparison result of the gray level voltage and the output signal when the pre-charge enable signal is enabled.

4. The driving apparatus of the display as claimed in claim 1, wherein the DAC circuit is a voltage selector, and the voltage selector selects to output one of a plurality of voltages according to the display data.

5. The driving apparatus of the display as claimed in claim 1, wherein the output buffer circuit further receives an output enable signal, and determines whether or not to output a driving output signal to the output terminal of the output buffer circuit according to the output enable signal.

6. The driving apparatus of the display as claimed in claim 5, wherein the output buffer circuit is an operation amplifier, the operation amplifier has a first input terminal, a second input terminal and an output terminal, wherein the first input terminal receives the gray level voltage, and the second input terminal is coupled to the output terminal.

7. A driving apparatus of a display, comprising:

a digital-to-analog converter (DAC) circuit, for receiving a display data with a digital format, and generating a gray level voltage according to the display data;

an output buffer circuit, coupled to the DAC circuit for receiving the gray level voltage, and the output buffer circuit having an output terminal to output an output signal, and comparing the gray level voltage and the output signal to generate a comparison signal indicating a result of the comparison ; and a pre-charge circuit, coupled to the output buffer circuit, receiving the comparison signal to generate a pre-charge output signal according to the comparison signal, and outputting the pre-charge output signal to the output terminal of the output buffer circuit.

* * * * *